(12) United States Patent
Theriot et al.

(10) Patent No.: US 7,895,051 B1
(45) Date of Patent: *Feb. 22, 2011

(54) METHOD TO FORM AN ACTUAL SALES OR DELIVERY VALUE FOR ALL COMPONENTS OF A COMMINGLED HYDROCARBON FLUID STREAM

(75) Inventors: William Joseph Theriot, Dickinson, TX (US); Mark Reese Brown, Pearland, TX (US); Joseph Edward Landes, Pearland, TX (US); William Jeffrey Wild, Friendswood, TX (US); Herman Reese Brown, Pearland, TX (US)

(73) Assignee: SPL, Inc., Pearland, TX (US)

( * ) Notice: Subject to any disclaimer, the term of this patent is extended or adjusted under 35 U.S.C. 154(b) by 143 days.

This patent is subject to a terminal disclaimer.

(21) Appl. No.: 12/409,990

(22) Filed: Mar. 24, 2009

(51) Int. Cl.
  *G06Q 99/00* (2006.01)
  *G01N 22/04* (2006.01)
(52) U.S. Cl. ............... 705/1.1; 705/7; 705/8; 705/37; 705/400; 702/6; 702/9; 166/308; 709/223
(58) Field of Classification Search .......... 705/1.1, 705/7–8, 10, 37–38, 400; 702/6; 709/223; 166/308.1
See application file for complete search history.

(56) References Cited

U.S. PATENT DOCUMENTS

| 3,660,649 | A | * | 5/1972 | Gilchrist et al. | |
|---|---|---|---|---|---|
| 3,761,701 | A | * | 9/1973 | Wilder et al. | |
| 4,845,628 | A | * | 7/1989 | Gray et al. | |
| 7,051,807 | B2 | * | 5/2006 | Vinegar et al. | 166/245 |
| 7,072,863 | B1 | | 7/2006 | Phillips et al. | |
| 7,373,285 | B2 | | 5/2008 | Webb | |
| 7,444,193 | B2 | | 10/2008 | Cutler | |
| 7,636,671 | B2 | * | 12/2009 | Caveny et al. | 705/10 |
| 7,676,420 | B1 | * | 3/2010 | Agnew et al. | 705/37 |
| 2003/0004648 | A1 | * | 1/2003 | Huffman et al. | 702/14 |
| 2005/0115711 | A1 | * | 6/2005 | Williams et al. | |
| 2005/0209912 | A1 | * | 9/2005 | Veeningen et al. | |
| 2006/0004593 | A1 | * | 1/2006 | Seat et al. | |
| 2006/0100943 | A1 | * | 5/2006 | Bennett | 705/35 |
| 2007/0094368 | A1 | * | 4/2007 | Erb et al. | |
| 2008/0052097 | A1 | * | 2/2008 | Bouzas et al. | 705/1 |
| 2008/0065445 | A1 | * | 3/2008 | Livesay et al. | |
| 2008/0091496 | A1 | * | 4/2008 | Gurpinar et al. | 705/8 |
| 2008/0235155 | A1 | * | 9/2008 | Thywissen | |
| 2008/0306803 | A1 | * | 12/2008 | Vaal et al. | |
| 2009/0032249 | A1 | * | 2/2009 | Morales et al. | 166/250.01 |

(Continued)

FOREIGN PATENT DOCUMENTS

GB 2146751 A * 4/1985

OTHER PUBLICATIONS

Ulrich, Carl W.; "Unbundling Natural Gas Sales Services- Is the FERC Throwing the Baby Out With the Bath Water?"; Oct. 13, 1988, Public Utilities Fortnightly, pp. 19-22.*

*Primary Examiner*—John W Hayes
*Assistant Examiner*—Freda A Nelson
(74) *Attorney, Agent, or Firm*—Buskop Law Group, PC; Wendy Buskop

(57) ABSTRACT

A method to form an actual sales value or actual delivery value for all components of a comingled hydrocarbon fluid stream using a theoretical comingled hydrocarbon fluid stream molecular composition.

16 Claims, 4 Drawing Sheets

U.S. PATENT DOCUMENTS

2009/0271233 A1* 10/2009 Prange et al. .................. 705/7
2009/0314487 A1* 12/2009 Medoff ....................... 166/247
2010/0096129 A1* 4/2010 Hinkel et al. ............. 166/270.1
2010/0155078 A1* 6/2010 Walters et al. .............. 166/369

* cited by examiner

|  | Stream A | Stream B | Stream C |
|---|---|---|---|
| Quantity of Individual Hydrocarbon Streams |  526 | 603 | 5000 |

Molecular Composition of Individual Hydrocarbon Stream

|  | Stream A | Stream B | Stream C |
|---|---|---|---|
| N2 | 0.005199 | 0.0049 | 0.003 |
| CO2 | 0.0014 | 0.063594 | 0.0043 |
| C1 | 0.539646 | 0.727827 | 0.989999 |
| C2 | 0.016198 | 0.092791 | 0.0022 |
| C3 | 0.027497 | 0.038096 | 0.0003 |
| IC4 | 0.005199 | 0.007799 | 0.0001 |
| NC4 | 0.012399 | 0.011599 | 0.0001 |
| IC5 | 0.006799 | 0.0044 | 0 |
| NC5 | 0.008699 | 0.0037 | 0 |
| C6 | 0.024498 | 0.009999 | 0 |
| C7 | 0.019098 | 0.006499 | 0 |
| C8 | 0.022398 | 0.0047 | 0 |
| C9 | 0.017398 | 0.0023 | 0 |
| C10+ | 0.293571 | 0.021798 | 0 |
|  | 1 | 1 | 1 |

Tagging of Components with Component Identifiers

| N2 | A-N2 | B-N2 | C-N2 |
|---|---|---|---|
| CO2 | A-CO2 | B-CO2 | C-CO2 |
| C1 | A-C1 | B-C1 | C-C1 |
| C2 | A-C2 | B-C2 | C-C2 |
| C3 | A-C3 | B-C3 | C-C3 |
| IC4 | A-IC4 | B-IC4 | C-IC4 |
| NC4 | A-NC4 | B-NC4 | C-NC4 |
| IC5 | A-IC5 | B-IC5 | C-IC5 |
| NC5 | A-NC5 | B-NC5 | C-NC5 |
| C6 | A-C6 | B-C6 | C-C6 |
| C7 | A-C7 | B-C7 | C-C7 |
| C8 | A-C8 | B-C8 | C-C8 |
| C9 | A-C9 | B-C9 | C-C9 |
| C10+ | A-C10 | B-C10 | C-C10 |

FIGURE 2

Commingling of Tagged Components

| | | Molecular Composition | Quantity of Tagged Components |
|---|---|---|---|
| Total Quantity of All | | | 6,129 |
| Tagged Commingled Stream | A-N2 | 0.000446284 | 2.74 |
| | A-CO2 | 0.000120153 | 0.74 |
| | A-C1 | 0.046319142 | 283.89 |
| | A-C2 | 0.001390347 | 8.52 |
| | A-C3 | 0.002360156 | 14.47 |
| | A-IC4 | 0.000446284 | 2.74 |
| | A-NC4 | 0.001064216 | 6.52 |
| | A-IC5 | 0.000583602 | 3.58 |
| | A-NC5 | 0.000746668 | 4.58 |
| | A-C6 | 0.002102685 | 12.89 |
| | A-C7 | 0.001639236 | 10.05 |
| | A-C8 | 0.001922455 | 11.78 |
| | A-C9 | 0.001493335 | 9.15 |
| | A-C10 | 0.025197888 | 154.44 |
| | B-N2 | 0.000482346 | 2.96 |
| | B-CO2 | 0.006260658 | 38.37 |
| | B-C1 | 0.071653029 | 439.16 |
| | B-C2 | 0.009135048 | 55.99 |
| | B-C3 | 0.003750488 | 22.99 |
| | B-IC4 | 0.000767816 | 4.71 |
| | B-NC4 | 0.001141881 | 7.00 |
| | B-IC5 | 0.000433127 | 2.65 |
| | B-NC5 | 0.000364221 | 2.23 |
| | B-C6 | 0.00098438 | 6.03 |
| | B-C7 | 0.000639847 | 3.92 |
| | B-C8 | 0.000462659 | 2.84 |
| | B-C9 | 0.000226407 | 1.39 |
| | B-C10 | 0.002145949 | 13.15 |
| | C-N2 | 0.002447404 | 15.00 |
| | C-CO2 | 0.003507945 | 21.50 |
| | C-C1 | 0.80756168 | 4,949.55 |
| | C-C2 | 0.001794763 | 11.00 |
| | C-C3 | 0.00024474 | 1.50 |
| | C-IC4 | 8.15801E-05 | 0.50 |
| | C-NC4 | 8.15801E-05 | 0.50 |
| | C-IC5 | 0 | - |
| | C-NC5 | 0 | - |
| | C-C6 | 0 | - |
| | C-C7 | 0 | - |
| | C-C8 | 0 | - |
| | C-C9 | 0 | - |
| | C-C10 | 0 | - |
| | | 1.00E+00 | 6,129.00 |

FIGURE 3

Proration of Theoretical Tagged Commingled Stream

| | | Stream A | Stream B | Stream C | Total Theoretical per Component |
|---|---|---|---|---|---|
| Theoretical Quantity per Stream | N2 | 2.74 | 2.96 | 15.00 | 20.69 |
| | CO2 | 0.74 | 38.26 | 21.44 | 60.43 |
| | C1 | 283.86 | 439.11 | 4948.94 | 5671.90 |
| | C2 | 8.49 | 55.76 | 10.96 | 75.20 |
| | C3 | 14.01 | 22.26 | 1.45 | 37.71 |
| | IC4 | 2.43 | 4.19 | 0.45 | 7.07 |
| | NC4 | 5.47 | 5.86 | 0.42 | 11.74 |
| | IC5 | 2.27 | 1.67 | 0.00 | 3.94 |
| | NC5 | 2.56 | 1.25 | 0.00 | 3.81 |
| | C6 | 3.56 | 1.69 | 0.00 | 5.24 |
| | C7 | 1.23 | 0.48 | 0.00 | 1.71 |
| | C8 | 0.60 | 0.15 | 0.00 | 0.75 |
| | C9 | 0.19 | 0.03 | 0.00 | 0.22 |
| | C10+ | 0.16 | 0.02 | 0.00 | 0.18 |
| | | 328.29 | 573.66 | 4998.65 | 5900.60 |

| | | | | | Total Delivery |
|---|---|---|---|---|---|
| Proration of Actual Sales or Delivery | N2 | 2.80 | 3.03 | 15.37 | 21.20 |
| | CO2 | 0.73 | 38.05 | 21.32 | 60.10 |
| | C1 | 290.39 | 449.21 | 5062.80 | 5802.40 |
| | C2 | 8.62 | 56.65 | 11.13 | 76.40 |
| | C3 | 14.93 | 23.72 | 1.55 | 40.20 |
| | IC4 | 2.93 | 5.04 | 0.54 | 8.50 |
| | NC4 | 4.89 | 5.24 | 0.37 | 10.50 |
| | IC5 | 2.60 | 1.90 | 0.00 | 4.50 |
| | NC5 | 2.49 | 1.21 | 0.00 | 3.70 |
| | C6 | 3.94 | 1.86 | 0.00 | 5.80 |
| | C7 | 0.86 | 0.34 | 0.00 | 1.20 |
| | C8 | 0.40 | 0.10 | 0.00 | 0.50 |
| | C9 | 0.35 | 0.05 | 0.00 | 0.40 |
| | C10+ | 0.26 | 0.04 | 0.00 | 0.30 |
| Total Quantity of Delivery | | 336.18 | 586.44 | 5113.08 | 6035.70 |

FIGURE 4

METHOD TO FORM AN ACTUAL SALES OR DELIVERY VALUE FOR ALL COMPONENTS OF A COMMINGLED HYDROCARBON FLUID STREAM

FIELD

The present embodiments generally relate to a method to form an actual sales or actual delivery value for all components of a comingled hydrocarbon fluid stream using a theoretical comingled stream molecular composition.

BACKGROUND

A need exists for an equitable method for allocating comingled production streams. Current methods ignore the energy transfer from one production stream to another production stream. This method fully accounts for the energy transfer of all components for all production sources in a comingled stream.

A further need exists to identify the value differential due to the effects of comingling production streams.

It is possible for a production stream to loose or gain value by the comingling effect. The same is true for natural gas streams. Pressure, temperature, and volume throughout the pipeline or the process can either cause an injected stream to loose or gain value which can hurt a seller or hurt a buyer (depending on the gain or loss).

The present embodiments meet these needs.

BRIEF DESCRIPTION OF THE DRAWINGS

The detailed description will be better understood in conjunction with the accompanying drawings as follows:

FIG. 2 is a molecular composition determined using this method from one of the samples.

FIG. 3 shows a theoretical comingled hydrocarbon fluid stream molecular composition.

FIG. 4 shows the pro-rated actual sales values and actual delivery values for comingled commodities analyzed in this method.

Figure 1:
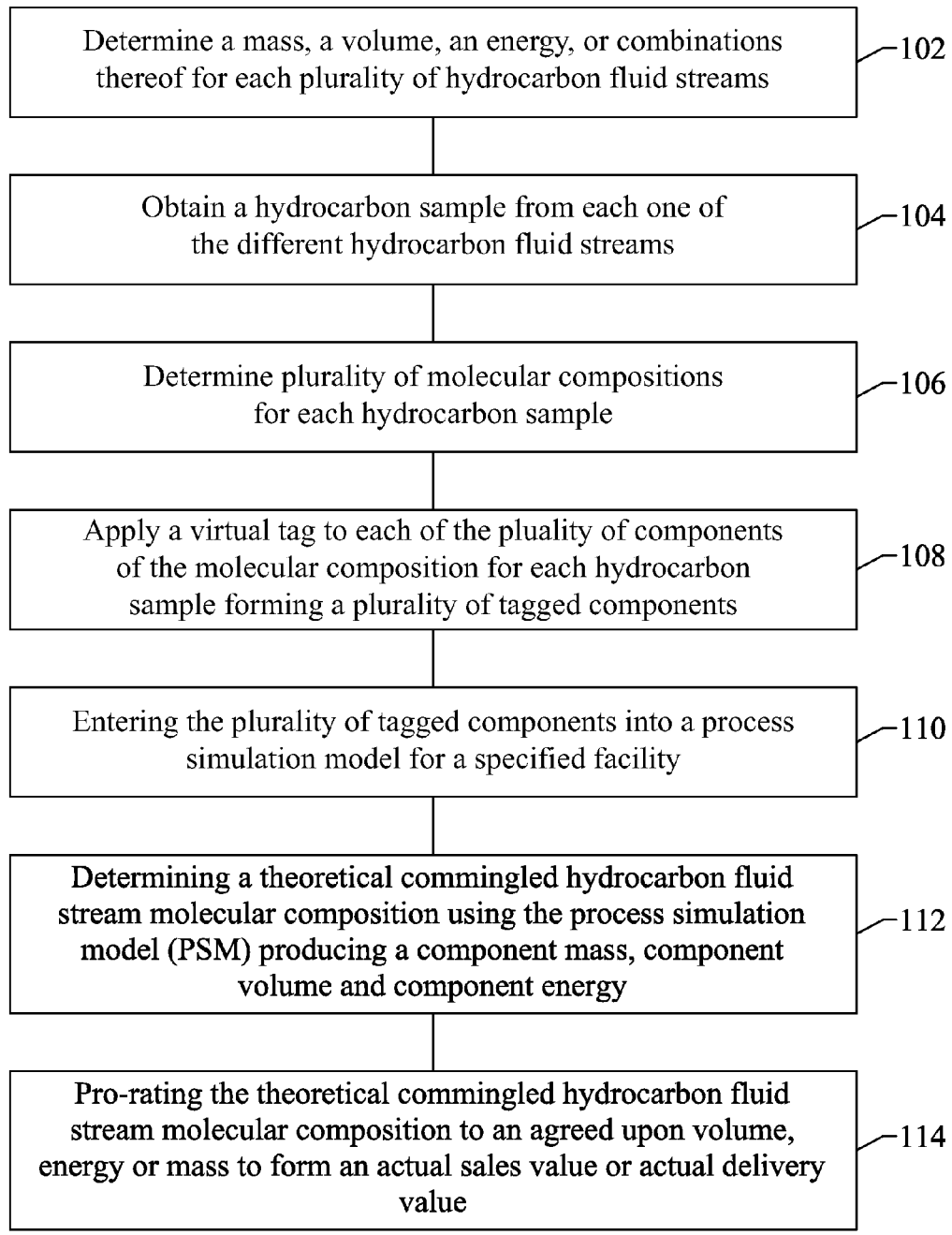
FIG. 1 is a diagram of the steps of the method of the invention.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments relate to a method to determine an actual sales value or actual delivery value for all components of a comingled hydrocarbon fluid stream using a theoretical comingled hydrocarbon fluid stream molecular composition.

The term "hydrocarbon fluid stream" as used herein can refer to a source of hydrocarbon fluid, from a process or a well and can be named for an offshore production facility from which the hydrocarbon fluid stream originates, such as, a well head, a spar, a tension leg platform, a semisubmersible, a jack up rig, a barge, another floating vessel, a subsea tie back, or an onshore geophysical source such as Midland, Texas's Permian basin zone 23-4, and can include a multiphase fluid.

The term "process simulation model" which is also referred to as "PSM" can be a software program, a group of computer instructions that direct a processor to perform a series of analytical steps. Process simulation models that are usable herein can include those made and commercially sold by Aspen Technology of Houston, Tex. and are known as "Hysis". Other usable PSM can be those sold by Virtual Materials Group of Calgary, Canada such as the "VGM Sim". Still other usable PSM can be those offered by Bryan Research and Engineering of Bryan, Tex. and are known as "Promax" or "ProSim". Still other usable PSM in the embodiments can include PSM known as "Unisym" which is offered by Honeywell Process Solutions of Houston, Tex. Still other usable PSM in the embodiments can include PSM known as "OLGA", which is offered by SPT Group of Kjeller Norway.

The term "actual sales value" can refer to the monetary value of all commodities of the hydrocarbon fluid stream at the custody transfer point in barrels, in cubic feet, MMBTU, or similar units.

The term "actual delivery value" can refer to the monetary value of all commodities of the hydrocarbon fluid stream at the delivery point in barrels, in cubic feet, MMBTU, or similar units.

The term "commodities" can refer to one or more comingled commodities, which can be a crude oil, a condensate, a natural gas, a liquefied natural gas, a liquefied petroleum gas, fractionated fluids, gas plant raw make, such as Y grade liquid, or combinations thereof.

A "comingled hydrocarbon fluid stream" can refer to hydrocarbon fluids from at least two sources, like two different wells each having a different owner or owners. The comingled hydrocarbon fluid streams can be introduced to a facility, such as a refinery, an offshore or onshore production gathering system, an offshore production facility, or a subsea well hub that processes the actual molecules of the hydrocarbon fluid stream. The individual molecules can have a sales price associated with those molecules, by component, such as methane. The molecules of the comingled hydrocarbon fluid stream can go through no phase change, one or more phase changes, or a partial phase change as they pass though a facility.

An embodiment of the invention can enable an owner of a well to understand the processing steps of the owner's molecules as they pass through a specified facility and it can enable the owner to be paid on all of the owner's molecules regardless of the phase changes experienced by the molecules.

The embodiments can further provide a predictive model, which can enable a buyer to see multiple molecules to be acquired by the owner and the various locations of those molecules even though the molecules are in the midst of a phase change.

The embodiments can provide a predictive model on component mass, component volume and component energy for molecules of a comingled hydrocarbon fluid stream.

The embodiments can provide an accurate method to pay an owner on the actual molecules processed from their well, while the molecules are in fact comingled with the molecules of fluids of other owners. In other methods, owners are paid on "aggregates" not true numbers of molecules.

FIG. 1 depicts the method beginning with a first step 102, determining a mass, a volume, an energy, or combinations thereof for each plurality of hydrocarbon fluid streams.

To determine a mass for at least one hydrocarbon fluid stream, the analysis can be by either a direct mass measurement using a mass flow meter such as those made by Micromotion of Boulder, Colo. or by using a volumetric meter and performing an inferred mass measurement. Usable volumetric meters can include those made by Daniels, of Houston, Tex. Mass can also be determined using a densitometer made by Fluid Dynamics of Rosemont, N.J.

To determine a volume for at least one of the hydrocarbon fluid streams, a volumetric flow meter can be used, such as one made by Omni Flow Computer of Stafford, Tex.

To determine an energy for at least one of the hydrocarbon fluid streams, a combination of a volumetric flow meter analysis combined with analysis using an online chromatograph can be used.

As an example, the mass of a first hydrocarbon fluid stream, (termed herein as Example A hydrocarbon fluid stream) which is a condensate could have a quantity of 100 barrels which in turn weighs 2300 pounds.

Similarly, in this example, the volume of that first hydrocarbon fluid stream, termed "Example A hydrocarbon fluid stream" having 100 barrels of condensate would be 4200 gallons.

If energy were being analyzed for that same "Example A hydrocarbon fluid stream", the energy for those 100 barrels of the condensate of Example A would be 115 mmbtu of energy.

FIG. 1, further depicts step 104, which can involve obtaining a plurality of hydrocarbon samples from each of the plurality of hydrocarbon fluid streams. Each hydrocarbon sample can be representative of each of the plurality of hydrocarbon fluid streams.

For example, a first sample from the Example A condensate can be metered using a meter and a quantity of 500 cc could comprise a first sample.

For a different hydrocarbon fluid stream, a sample can be virtually metered using a continuous sampling method to be a quantity of 1000 cc as a second sample.

Each sample can be pulled from each hydrocarbon fluid stream by a continuous sampling system, a batch sampling system or another spot sampling system. An example of one of these sampling systems can be a YZ-3010 sampling system made by YZ Industries of Houston, Tex.

A first processor with a first processor data storage can have computer instructions therein, and can be used to instruct the meters to measure out the samples, analyze the samples for volume, mass or energy and transmit the analyzed data to the first processor.

FIG. 1, further depicts next step 106, a plurality of molecular compositions can be determined for each of the hydrocarbon samples. Each molecular composition can be made up of a plurality of components.

In an embodiment, the molecular compositions can be determined simultaneously for the samples, which enable the entire process to be extraordinarily fast.

Other concentrations, units, of the molecular composition can be identified such as mole percents, liquid volume percents, liquid volume fractions, mass fractions, mass percents or another unit.

FIG. 1, further depicts next step 108, wherein a virtual tag can be applied to each of the plurality of components for each hydrocarbon sample, forming a plurality of tagged components.

The virtual tag can be a number such as 1C1.

The virtual tag can be a color, such as redC1.

The virtual tag can be an alphanumeric indicator such as K2C2, a biometric indicator, such as a fingerprint or a voice print, a bar code, or combinations of all of these items. The virtual tag can be one that another computer can identify. In an embodiment a virtual tag can be inserted into an animation of a specified facility so that the component can be traced completely through the PMS as the tagged component is processed and has none, one or more phase changes, or a partial phase change during processing.

The virtual tag can includes as part of the "tag" an identified production source. An identified production source can be a geographic location, such as Green Canyon Block 65, an arbitrary name given by a production source or equipment owner such as Troika™, a leased production field name such as Blocker Field Panola County Tex., a name of an operator of a field such as Petrobras 01, a name of an operator of a well, such as Devon, a name of a hydrocarbon producer, such as Shell Oil Company, a name of a purchaser of one of the plurality of hydrocarbon fluid streams, such as Plains All American Pipeline, or combinations of these items.

FIG. 1, further shows as the next step, step 110, the plurality of tagged components can be entered into a process simulation model (PSM) for a specified facility. The specified facility can be a Shell deepwater hub in the Gulf of Mexico.

FIG. 1, further shows using at least one processor or possibly several processors connected in series or in parallel through one or more networks, and the process simulation model for the specified facility, a theoretical comingled hydrocarbon fluid stream molecular composition can be determined, and is shown as step 112.

This theoretical comingled hydrocarbon fluid stream molecular compositions can provide a component mass, such as 1000 pounds of propane, a component volume, such as 1000 liters of butane, a component energy, such as 1200 btu, or combinations thereof, for each of the plurality of components of the theoretical comingled hydrocarbon fluid stream molecular composition using the mass, the volume, the energy, or combinations thereof from the samples.

In FIG. 1 and as step 114, the processor or the group of processors can be used to pro-rate the theoretical comingled hydrocarbon fluid stream molecular composition to an agreed upon volume, such as 300 barrels of oil, or an agreed upon mass, such as 1,000,000 pounds of natural gas and/or an agreed upon energy, such as 200 mmbtu between a buyer, such as Enterprise Products, and a seller, such as Chevron to form the actual sales value, such as $1,000,000 US, for the products or actual delivery value, which can be the same number, but delivered to a different party than the buyer, such as Tennessee Gas Pipeline taking delivery for Consumers Power of Michigan for the plurality of tagged components in the comingled hydrocarbon fluid stream.

FIG. 2 is a molecular composition determined using the method from one of the hydrocarbon samples. The molecular compositions can be represented as mole fractions also shown in this Figure.

FIG. 3 shows a theoretical comingled hydrocarbon fluid stream molecular composition after tagging of the components.

FIG. 4 shows prorated actual sales values and actual delivery values for a plurality of commodities analyzed with this method using the theoretical comingled hydrocarbon fluid streams.

The method can contemplate that concurrently with the method described above, a seller or a buyer can view or predict the location of any one of the plurality of tagged components, as the tagged component is processed through any part of the PSM of a specified facility and can view any phase change experienced by any portion of any one of the tagged components.

The method can contemplate that the plurality of hydrocarbon fluid streams can include at least one production stream, such as an offshore production stream, for example a stream from the Marco Polo production hub in the Gulf of Mexico.

The method can contemplate that at least one of the hydrocarbon fluid streams can be a pipeline condensate or a "retrograde" condensate, such as condensate from the Williams Southeast Lateral Pipeline System located offshore Louisiana.

In an embodiment, the process simulation model can include an equation of state such as Peng-Robinson or SRK or any other similar equation of state.

The mass, energy, volume or combinations thereof, which can be determined in this method can be computed using a meter, such as an orifice meter, made by Daniel Industries of Houston, Tex., a metering station which can have a meter and valve, actuators, meter tubes, remote terminal unit with a meter such as with RTU's made by AutoSol of League City, Tex. or Bristol Babcock, a virtual meter, such as a Multiphase Solutions, Inc. of Houston, Tex., or combinations thereof.

In an embodiment, at least one of the plurality of molecular compositions can be analyzed using gas chromatography, distillation, pressure volume temperature analysis, infrared analysis, titration, thermal spectral analysis, or combinations thereof.

The molecular components being determined by the molecular analysis for the molecular composition can include nitrogen, argon, helium, carbon dioxide, oxygen, sulfur and sulfur species, water, hydrocarbons 1 through 100 (referred to herein as "C1 through C-100 hydrocarbons"), and combinations thereof.

In an embodiment, the virtual tag can include the chemical name of the component, and another element, such as "Methane, Genghis Khan" which can indicate the molecule methane, with the name of an offshore development "Genghis Khan" that provided the hydrocarbon fluid stream.

The method can contemplate that the virtual tag can be an alphanumeric number, a binary number, a bar code, a color, an animation, such as an animation of the flow of fluids through a gas processing facility, a series of objects, such as a series of arrows, a biometric indicator, such as a retinal scan, a hexadecimal code, or combinations thereof.

In an embodiment, the method can further contemplate that the specified facility can be geographically identifiable, such as an address 1000 Lawndale of Houston, Tex.

The method can contemplate that the actual sales value or actual delivery value can be computed when custody transfer of the comingled hydrocarbon fluid stream occurs from the seller to the buyer and money is assigned to the seller based on component volumes or component masses for each components of the comingled hydrocarbon fluid streams.

The method can contemplate using at least one processor or two connected in series or in parallel, over one or more networks to pro-rate the theoretical comingled hydrocarbon fluid stream molecular composition to an agreed upon volume, an agreed upon mass, an agreed upon energy, or combinations thereof, between a buyer and a seller, to form the actual sales value or actual delivery value for each components in the comingled hydrocarbon fluid stream.

In an embodiment, and concurrently with steps described above for pro-rating, the method can include the step of calculating the location of any one of the plurality of tagged components as any one of the plurality of tagged components is processed through any part of the specified facility, and wherein the step of calculating the location can accommodate any phase change experienced by any portion of any one of the tagged components.

While these embodiments have been described with emphasis on the embodiments, it should be understood that within the scope of the appended claims, the embodiments might be practiced other than as specifically described herein.

What is claimed is:

1. A method for computing an actual sales value or an actual delivery value for all of a plurality of commodities of a comingled hydrocarbon fluid stream, comprising the steps of:
   c. determining a plurality of molecular compositions, one molecular composition for each of the hydrocarbon samples, wherein each of the molecular compositions comprises a plurality of components;
   d. applying a virtual tag to each of the plurality of components, forming a plurality of tagged components for each hydrocarbon sample;
   e. entering the plurality of tagged components into a process simulation model (PSM) for a specified facility;
   f. using a computer processor with the process simulation model (PSM) for the specified facility to compute a theoretical comingled hydrocarbon fluid stream molecular composition and compute a member of the group consisting of: a component mass, a component volume, a component energy, or combinations thereof, for each theoretical comingled hydrocarbon fluid stream molecular composition using the mass, the volume, the energy, or combinations thereof of the plurality of hydrocarbon fluid streams; and
   g. using at least one computer processor, pro-rate the theoretical comingled hydrocarbon fluid stream molecular composition to an agreed upon volume, an agreed upon mass, an agreed upon energy, or combinations thereof, between a buyer and a seller, to form the actual sales value or actual delivery value for each component in the comingled hydrocarbon fluid stream.

2. The method of claim 1, concurrently with step (g), the step of calculating the location of any one of the plurality of tagged components as any one of the plurality of tagged components is processed through any part of the specified facility, and wherein the step of calculating the location accommodates any phase change experienced by any portion of any one of the tagged components.

3. The method of claim 1, wherein the process simulation model comprises at least one phase change for at least one of the plurality of tagged components.

4. The method of claim 1, wherein at least one of the pluralities of commodities can include a member of the group consisting of: a crude oil, a condensate, a natural gas, a liquefied natural gas, a liquefied petroleum gas, or combinations thereof.

5. The method of claim 1, wherein the plurality of hydrocarbon fluid streams include at least one production stream.

6. The method of claim 5, wherein the at least one production stream is an offshore production stream.

7. The method of claim 1, wherein the plurality of hydrocarbon fluid streams include a pipeline condensate, a "retrograde" condensate or combinations thereof.

8. The method of claim 1, wherein virtual tag includes an identified production source.

9. The method of claim 8, wherein the identified production source comprises: a geographic location, an arbitrary name given by a production source or equipment owner, a leased production field name, a name of an operator of a field, a name of an operator of a well, a name of a hydrocarbon producer, a name of a purchaser of one of the plurality of hydrocarbon fluid streams, or combinations thereof.

10. The method of claim 1, wherein the process simulation model comprises an equation of state.

11. The method of claim 1, wherein at least one of the plurality of hydrocarbon samples is obtained through a continuous sampling system, a batch sampling system or another spot sampling system.

12. The method of claim 1, wherein the step for determining at least one of the plurality of molecular compositions is by a member selected from the group: gas chromatography, distillation, pressure volume temperature analysis, infrared analysis, titration, thermal spectral analysis, or combinations thereof.

13. The method of claim 1, wherein the plurality of components of the molecular composition comprise: nitrogen, argon, helium, carbon dioxide, oxygen, sulfur and sulfur species, water, C1 through C-100 hydrocarbons, and combinations thereof.

14. The method of claim 1, wherein the virtual tag comprises: a chemical name of one of the plurality of component and a member of the group consisting of: a number, a bar code, a color, an alphanumeric indicator, an animation, a series of objects, a biometric indicator, a hexadecimal code or combinations thereof.

15. The method of claim 1, wherein the specified facility of the PSM is a geographically identifiable facility.

16. The method of claim 1, wherein the actual sales value or actual delivery value is computed when custody transfer of the comingled hydrocarbon fluid stream occurs from the seller to the buyer and money is assigned to the seller based on component volumes, component energies, component masses or combinations thereof for each component of the comingled hydrocarbon fluid streams.

* * * * *